No. 738,322. PATENTED SEPT. 8, 1903.
L. C. HARTSOCK.
BREAD AND KNEADING BOARD.
APPLICATION FILED APR. 20, 1903.
NO MODEL.

Witnesses:
Berlin G. Brown
S. R. Brattan

Inventor
Luther C. Hartsock,
Collamer & Co.
Attorneys

No. 738,322. Patented September 8, 1903.

UNITED STATES PATENT OFFICE.

LUTHER C. HARTSOCK, OF SPRINGVALLEY, OHIO.

BREAD AND KNEADING BOARD.

SPECIFICATION forming part of Letters Patent No. 738,322, dated September 8, 1903.

Application filed April 20, 1903. Serial No. 153,466. (No model.)

*To all whom it may concern:*

Be it known that I, LUTHER C. HARTSOCK, a citizen of the United States, and a resident of Springvalley, Greene county, State of Ohio, have invented certain new and useful Improvements in Bread and Kneading Boards; and my preferred manner of carrying out the invention is set forth in the following full, clear, and exact description, terminating with claims particularly specifying the novelty.

This invention relates to kitchen utensils, and more especially to bread and kneading boards; and the object is to produce an article of this description which shall have a high degree of strength, possess a perfectly smooth kneading-surface, and which will not warp.

To this end my invention consists in the details of construction described below and shown in the accompanying drawings, in which—

Figure 1:
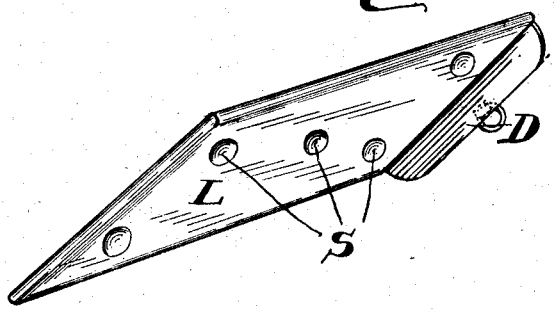
Figure 2:
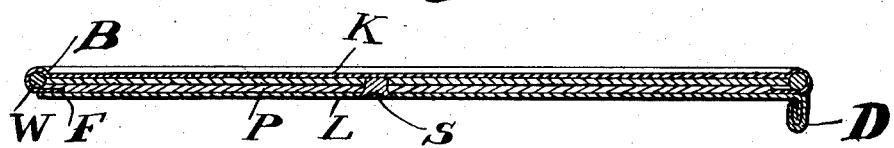
Figure 3:
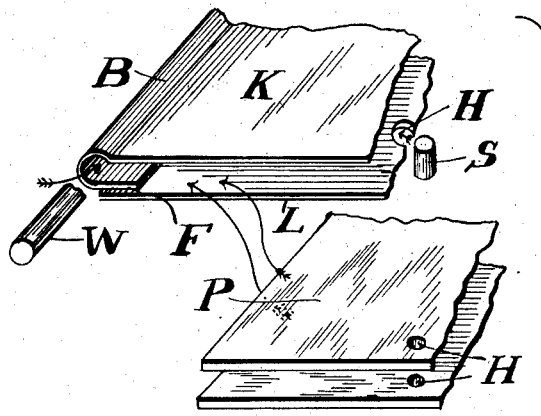

Figure 1 is a perspective view of this bread and kneading board viewed from the under side. Fig. 2 is a longitudinal section. Fig. 3 is a perspective detail showing the various parts slightly separated.

My improved bread and kneading board consists of three main parts—an upper layer of metal, forming the kneading-surface, a lower layer of metal, and an interposed filling, and with these parts are employed certain details. The upper layer, forming the kneading-surface, is designated in the accompanying drawings by the letter K and the lower layer by the letter L, both being preferably of heavy block-tin. The filling is of fiber, paper, wood, or the like. In Fig. 3 it is designated by the letter P, and two thicknesses of wood are there shown with their grains running in different directions. This filling is interposed between the metal layers, and a beading of wire W is caused to surround the entire board, which is preferably rectangular in contour. The upper layer K is rolled over this wire, as at B, and turned in under in a flange F, and that flange is soldered upon the lower layer L around its edges, whereby the entire bread-board will lie flat upon a smooth surface and the covered wire will rise a little above the upper surface of the kneading layer K, so as to form a surrounding ridge to prevent flour and moisture from running off.

Preferably at one end of the kneading-board the lower layer L is bent downward at right angles into a depending flange D, and this may be of several thicknesses soldered together, so as to give rigidity and strength. The double purpose of this flange is to prevent warping or bending of the entire board and to rest against the front edge of a table or other support, so as to prevent the device from slipping away from the user.

Heretofore in bread-boards of this character comprising a metal sheathing surrounding a filling the upper and lower sheets have been connected only at their edges, and when these points of connection become weakened the board springs out of shape and becomes practically useless. In order to avoid this difficulty, I therefore connect the various layers by means additional to those described. Through the lower layer L and the filling P, I form a number of holes H, and through these holes are passed plugs of solder S, which closely fit in the holes and rest against the lower surface of the upper layer K. These plugs are then heated and expanded by a suitable tool, so that they adhere to the edges of the holes and to the lower face of the upper layer. The top of the bread-board will still remain perfectly smooth, and the bottom of the breadboard may have slight indentations where the ends of these plugs occur. The result of this arrangement is to produce a combined board impervious to moisture whose parts are united practically into one homogeneous mass. Boards constructed in this manner and provided with my strengthening-beading and reinforced flange will stand any amount of wear without losing their shape.

What is claimed as new is—

1. A bread and kneading board comprising a plurality of layers of which all but the top one are perforated, and a series of plugs of solder engaging said perforations and adhering to the under side of the top layer.

2. A bread and kneading board comprising a filling, a bottom layer of metal, the whole of said layer being beneath the filling, a top layer also of metal, and a surrounding bead rising above the upper face of the top layer, the edges of said layer being turned over the bead and soldered upon the bottom layer.

3. A bread and kneading board comprising top and bottom layers of metal with a surrounding bead rising above the upper face of the top layer, the edges of said layer being turned over the bead and soldered upon the bottom layer, and a filling interposed between said layers; combined with plugs of solder passing upward through the bottom layer and the filling and adhering to the lower surface of the top layer.

4. A bread and kneading board comprising a rectangular bottom layer of metal having a downturned flange at one end, a rectangular top layer of metal soldered around its edges to said bottom layer, a filler interposed between said layers, and means for connecting these layers through holes in the filler at various points.

5. A bread and kneading board comprising a rectangular bottom layer of metal having a downturned flange at one end, a rectangular top layer of metal soldered around its edges to said bottom layer, a wire surrounding these layers and over which the edges of the top layer are turned in a bead rising above its upper face, a filler interposed between said layers, and means for connecting these layers through holes in the filler at various points.

In testimony whereof I have hereunto subscribed my signature this 18th day of April, A. D. 1903.

LUTHER C. HARTSOCK.

Witnesses:
ELVIRA F. TRUMAN,
GEO. TRUMAN.